Feb. 4, 1941.                A. CADIROLA                 2,230,400
           REVOLVING CIRCULAR SHEET CUTTING DEVICE
                    Filed July 19, 1939          2 Sheets-Sheet 2
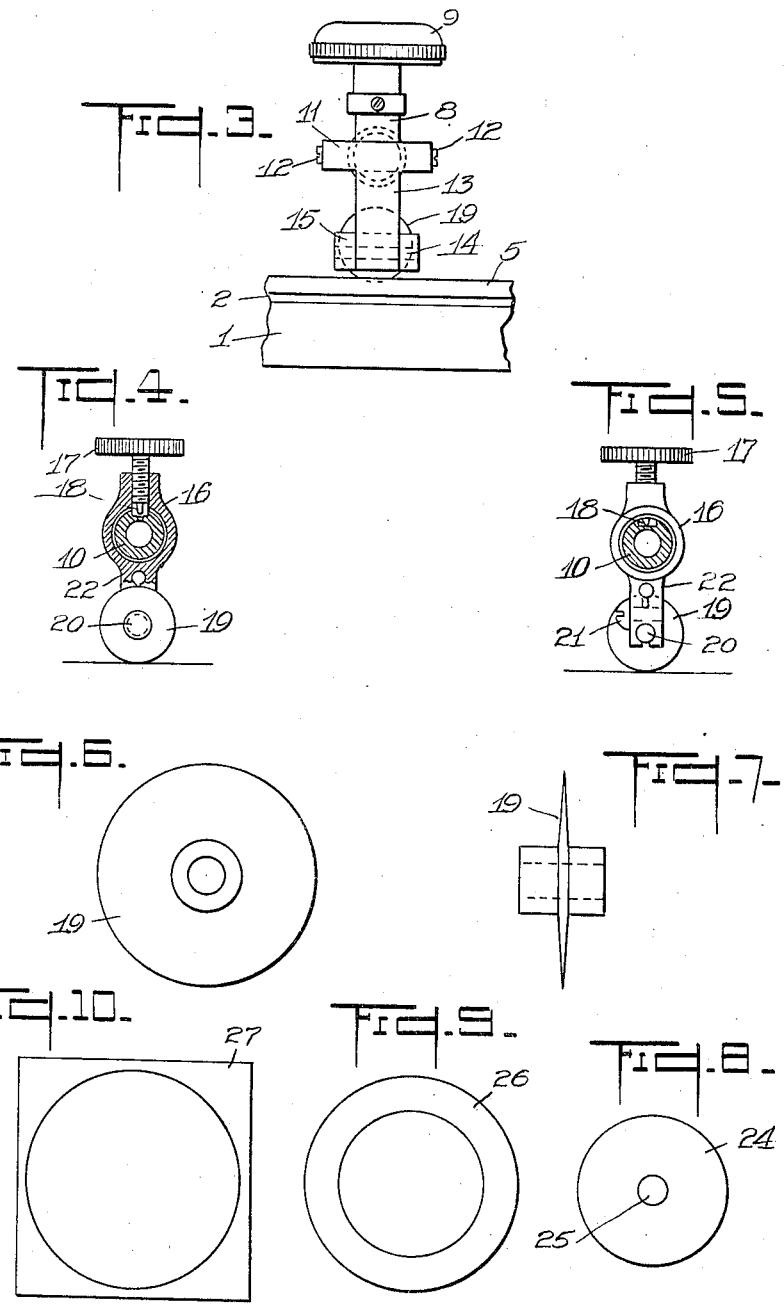
Alessandro Cadirola
INVENTOR Patented Feb. 4, 1941

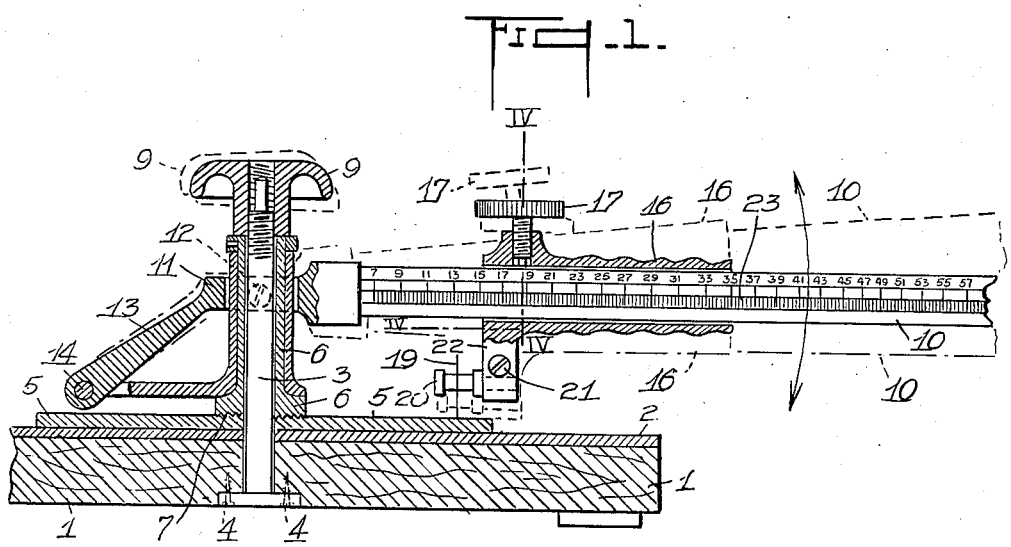
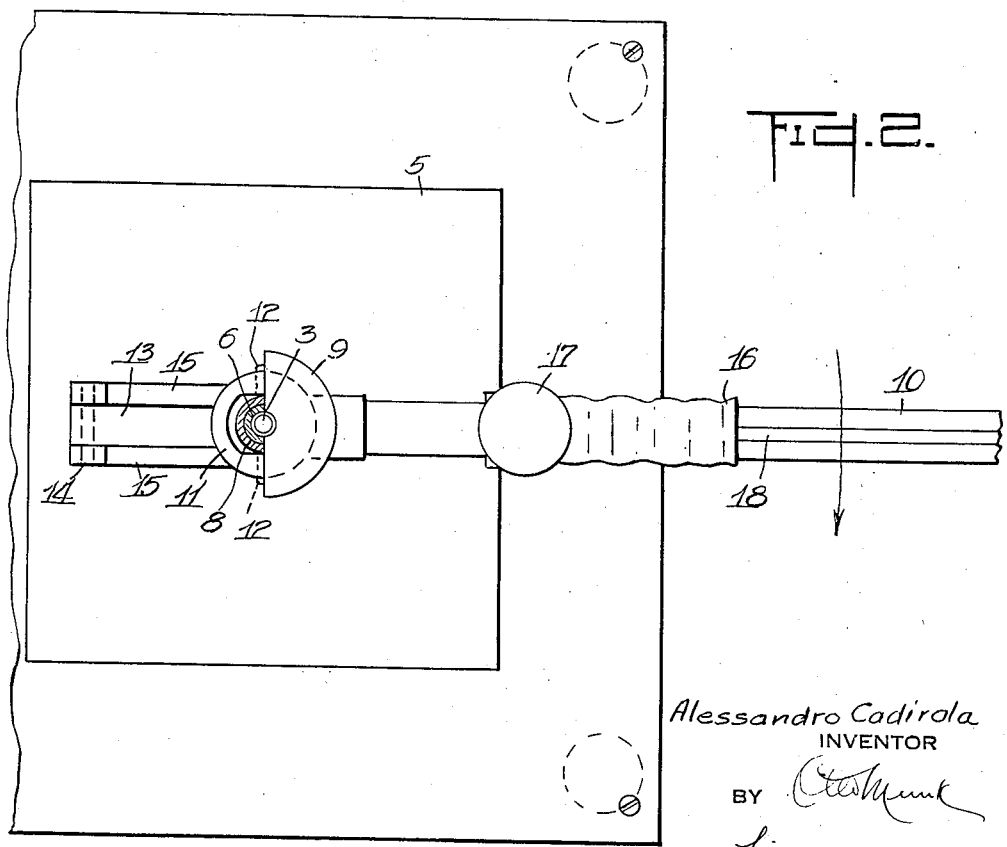

2,230,400

UNITED STATES PATENT OFFICE 2,230,400

REVOLVING CIRCULAR SHEET CUTTING DEVICE

Alessandro Cadirola, Milan, Italy

Application July 19, 1939, Serial No. 285,233
In Italy December 2, 1938

5 Claims. (Cl. 164—71)

The present invention relates to revolving circular sheet cutting devices for cutting out discs or rings from rubber, cork, asbestos, felt, millboard and other materials for use as gaskets and washers.

One object of the present invention is to provide a cutting device of the type described which can be operated very easily while effecting cuts of great accuracy.

Another object is to produce a device in which the cutting blade carrying arm can be raised and lowered relative to the revolving member on which it is supported.

A still further object is to provide means for easily and accurately adapting the device to the particular thickness of the sheet to be cut.

Other objects will appear as the description proceeds.

An embodiment of the invention is illustrated, by way of example, in the accompanying drawings, in which:

Fig. 1 is an axial section of the device;

Fig. 2 is a plan view of the device, in part section;

Fig. 3 is an end elevation of the device as seen from the left in Fig. 1;

Fig. 4 is a section taken on the line IV, IV, IV, of Fig. 1, as seen from the left in Fig. 1;

Fig. 5 is a section taken on the same vertical line as that on which Fig. 4 is taken but looking to the right.

Figs. 6 and 7 are two elevational views of the rotary disc-shaped cutting blade, on an enlarged scale;

Figs. 8, 9 and 10 show types of cuts executed by means of the device.

Referring to the drawings, 1 is a base-plate provided with a covering 2; 3 denotes a king-pin secured to the plate 1 by means of screws 4; 5 is a sheet of material to be cut; 6 is a disc mounted on the pin 3 above the work 5 and provided on its under surface with serrations 7 by which it is enabled to grip the work when pressed upon it by the weight of the working parts of the device; 8 is a capstan rotatably and removably fitted on the king-pin 3; 9 is a cap which, when screwed on the pin 3, holds the capstan in position, according to the thickness of the sheet 5 to be cut; 10 is a graduated arm provided with an eye 11 so dimensioned as to fit with clearance in the direction of the length of the arm 10 over the capstan 8 so as to allow of up and down pivotal movement relatively to the capstan while being prevented from side to side movement by means of screws 12 bearing against the side of the capstan; 13 is an extension on the arm 10, which serves to counterbalance the arm and by which the arm is pivoted at 14 to a lug 15 on the capstan 8; 16 denotes a runner capable of being moved longitudinally but not of being turned on the graduated arm 10 on which it can be fixed in any desired position by means of a set-screw 17; 19 denotes a circular-shaped cutting blade which is mounted on a pin 20 fixed by means of a screw 21 in an extension 22 on the underside of the runner 16; 18 is a longitudinal groove in the arm 10 in which the set-screw 17 engages to prevent the runner 16 from turning on the arm 10 owing to the resistance encountered by the blade in cutting through the work.

The mode of operation of the device is as follows:

After removing the capstan 8, together with the arm 10 and the small disc 6, from the king-pin 3, the sheet of material 5 to be cut is threaded on the pin 3 by means of a previously made hole at the centre and is placed in position upon the covering 2 of the base-plate 1. The disc 6 and the assembly comprising capstan, arm runner, and cutting blade are then replaced on the king-pin, and the knob 9 screwed on to the top of the pin. It then merely remains to bring the runner 16 to the position on the arm 10 corresponding to the diameter of the cut to be made, which is effected with the aid of the graduation marks 23 on the arm 10, to fix the runner by means of the set-screw 17 and to revolve the arm 10. The circular cutting blade 19 thereby produces a cut of the desired diameter in the work. For instance, there may be cut out of the sheet 5 a larger disc and then a smaller disc 24, leaving an annulus 26, the smaller disc 24 retaining the hole by means of which the sheet was threaded on the king-pin 3. The remaining portion of the sheet is denoted by 27 in Fig. 10.

As already pointed out, the arm 10 can be moved up and down through a limited angle as indicated by dotted lines in Fig. 1. This result being achieved in the present instance by the described manner of pivoting the arm 10 and of fitting it with play in the direction of its length only, over the king-pin 3.

It is to be understood that the constructive details of the device may be varied without departing from the scope of the invention as defined in the claims.

Having now particularly described and ascertained the nature of my said invention and in what manner the same is to be performed, I declare that what I claim is:

1. A revolving circular sheet cutting device, comprising a base plate to support the sheet to be cut, a king pin secured to and projecting upwardly from said base plate, a capstan fitted removably on said king pin for revolution about the same, said capstan including a radially projecting lug, an arm including a radial and substantially horizontal main portion, an eye fitted over said capstan, and a radial extension on the other side of said eye and in alignment with said main portion, said extension being pivoted to said lug on said capstan, a runner adjustably slidable on the main portion of said arm, and a cutting blade carried by said runner.

2. A device, as claimed in claim 1, in which said eye is fitted over said capstan with clearance in the direction of the length of the arm, said device including set screws in the branches of said arm forming said eye to bear against said capstan for preventing sidewise movements of said arm.

3. A device, as claimed in claim 1, including a screw cap applied to the top of the king pin to hold the capstan in position thereon.

4. A device, as claimed in claim 1, in which the main portion of said arm is provided with a longitudinal groove, and said runner includes a set screw engaging into said groove to prevent the runner from turning on said arm.

5. A device, as claimed in claim 1, comprising a disc mounted on said king pin beneath said capstan, said disc having a serrated lower surface to engage and hold the sheet to be cut.

ALESSANDRO CADIROLA.